(12) United States Patent
Falla et al.

(10) Patent No.: US 10,709,006 B2
(45) Date of Patent: Jul. 7, 2020

(54) FLUID-COOLED CONTACT TIP ASSEMBLY FOR METAL WELDING

(71) Applicant: Norsk Titanium AS, Hønefoss (NO)

(72) Inventors: Tom-Erik Falla, Jevnaker (NO); Arne Ramsland, Hole (NO)

(73) Assignee: NORSK TITANIUM AS, Hønefoss (NO)

( * ) Notice: Subject to any disclaimer, the term of this patent is extended or adjusted under 35 U.S.C. 154(b) by 580 days.

(21) Appl. No.: 15/206,158

(22) Filed: Jul. 8, 2016

(65) Prior Publication Data
US 2018/0014397 A1    Jan. 11, 2018

(51) Int. Cl.
| | |
|---|---|
| *H05H 1/34* | (2006.01) |
| *B23K 35/32* | (2006.01) |
| *B23K 9/28* | (2006.01) |
| *B23K 35/02* | (2006.01) |
| *B23K 9/04* | (2006.01) |
| *B23K 35/30* | (2006.01) |
| *B33Y 10/00* | (2015.01) |
| *B33Y 30/00* | (2015.01) |
| *B23K 10/02* | (2006.01) |
| *H05H 1/28* | (2006.01) |

(Continued)

(52) U.S. Cl.
CPC .............. *H05H 1/34* (2013.01); *B23K 9/044* (2013.01); *B23K 9/285* (2013.01); *B23K 10/027* (2013.01); *B23K 35/0255* (2013.01); *B23K 35/3033* (2013.01); *B23K 35/325* (2013.01); *B33Y 10/00* (2014.12); *B33Y 30/00* (2014.12); *H05H 1/28* (2013.01); *H05H 1/42* (2013.01); *H05H 1/44* (2013.01); *B23K 2103/14* (2018.08); *H05H 2001/3489* (2013.01)

(58) Field of Classification Search
CPC .. H05H 1/34; H05H 1/28; H05H 1/44; H05H 1/42; H05H 2001/3489; B33Y 10/00; B33Y 30/00
USPC ........ 219/61.3, 136, 137.42, 137.51, 137.61, 219/137.62
See application file for complete search history.

(56) References Cited

U.S. PATENT DOCUMENTS

| | | | |
|---|---|---|---|
| 2,179,108 A | 11/1939 | Westberg | |
| 4,309,590 A * | 1/1982 | Stol ...................... | B23K 9/0213 219/136 |

(Continued)

FOREIGN PATENT DOCUMENTS

| | | |
|---|---|---|
| DE | 2949318 | 6/1981 |
| DE | 3941980 | 6/1991 |

(Continued)

OTHER PUBLICATIONS

Taminger, Karen and Hafley, Robert, "Electron Beam Freeform Fabrication for Cost Effective Near-Net Shape Manufacturing", 2006, pp. 1-9, NATO/RTOAVT-139 Specialists' Meeting on Cost Effective Manufacture via Net Shape Processing, Amsterdam, the Netherlands.

(Continued)

*Primary Examiner* — Thien S Tran
(74) *Attorney, Agent, or Firm* — Dentons US LLP

(57) ABSTRACT

Provided is a fluid-cooled contact tip assembly that can be used in methods and systems for manufacturing objects by solid freeform fabrication, especially titanium and titanium alloy objects, where the deposition rate is increased by increasing the flow rate of electric charge through the metal wire.

14 Claims, 6 Drawing Sheets

(51) Int. Cl.
  *H05H 1/42* (2006.01)
  *H05H 1/44* (2006.01)
  *B23K 103/14* (2006.01)

(56) References Cited

U.S. PATENT DOCUMENTS

| | | | |
|---|---|---|---|
| 4,540,879 A | | 9/1985 | Hearther et al. |
| 4,591,685 A | * | 5/1986 | Hinger ................ B23K 9/0213 219/136 |
| 4,667,083 A | | 5/1987 | Stol |
| 5,313,046 A | * | 5/1994 | Zamuner ................ B23K 9/295 219/137.62 |
| 5,973,291 A | * | 10/1999 | Kramer ................ B23K 9/125 219/130.01 |
| 6,344,287 B1 | | 2/2002 | Celik et al. |
| 7,892,597 B2 | | 2/2011 | Hooker et al. |
| 2005/0016977 A1 | | 1/2005 | Heino |
| 2006/0081675 A1 | * | 4/2006 | Enyedy ................ B23K 9/125 226/181 |
| 2006/0151453 A1 | * | 7/2006 | Gordon ................ B23K 9/123 219/137.61 |
| 2006/0185473 A1 | | 8/2006 | Withers et al. |
| 2010/0193480 A1 | | 8/2010 | Adams |

FOREIGN PATENT DOCUMENTS

| | | |
|---|---|---|
| EP | 0958061 | 11/1999 |
| EP | 1108491 | 6/2001 |
| EP | 2199005 | 6/2010 |
| JP | S56144876 | 11/1981 |
| JP | H11123559 | 5/1999 |
| WO | 2003039800 | 5/2003 |
| WO | 2006/133034 | 12/2006 |
| WO | 2006133034 | 12/2006 |
| WO | 2012/134299 | 10/2012 |

OTHER PUBLICATIONS

Taminger, Karen and Hafley, Robert, "Characterization of 2219 Aluminum Produced by Electron Beam Freeform Fabrication", Aug. 5-7, 2002, pp. 482-489, Presented at the 13th Solid Freeform Fabricatoin Symposium, Austin, Texas.

Taminger, Karen and Hafley, Robert, "Electron Beam Freeform Fabrication: A Rapid Metal Deposition Process", Sep. 9-10, 2003, Proceedings of the 3rd Annual Automotive Composites Conference, Troy, Michigan.

International Preliminary Report on Patentability of PCT/EP2017/056392, dated Oct. 22, 2018.

* cited by examiner

FLUID-COOLED CONTACT TIP ASSEMBLY FOR METAL WELDING

FIELD OF THE INVENTION

The present invention relates to a method and arrangement for manufacturing objects by solid freeform fabrication, especially titanium and titanium alloy objects.

BACKGROUND OF THE INVENTION

Structured metal parts made of titanium or titanium alloys are conventionally made by casting, forging or machining from a billet. These techniques have a disadvantage of high material waste of the expensive titanium metal and large lead times in the fabrication of the metal part.

Fully dense physical objects can be made by a manufacturing technology known as rapid prototyping, rapid manufacturing, layered manufacturing, solid freeform fabrication, additive fabrication, additive manufacturing or 3D printing. This technique employs computer aided design software (CAD) to first construct a virtual model of the object which is to be made, and then transform the virtual model into thin parallel slices or layers, usually horizontally oriented. The physical object can then be made by laying down successive layers of raw material in the form of liquid paste, powder or other layerable, spreadable or fluid form, such as melted metal, e.g., from a melted welding wire, or preformed as sheet material resembling the shape of the virtual layers until the entire object is formed. The layers are fused together to form a solid dense object.

Solid freeform fabrication is a flexible technique allowing creation of objects of almost any shape at relatively fast production rates, typically varying from some hours to several days for each object. The technique is thus suited for formation of prototypes and small production quantity, and can be scaled-up for large volume production.

The technique of layered manufacturing can be expanded to include deposition of pieces of the construction material, that is, each structural layer of the virtual model of the object is divided into a set of pieces which when laid side by side form the layer. This allows forming metallic objects by welding a wire onto a substrate in successive stripes forming each layer according to the virtual layered model of the object, and repeating the process for each layer until the entire physical object is formed. The accuracy of the welding technique is usually too coarse to allow directly forming the object with acceptable dimensions. The formed object will thus usually be considered a green object or pre-form which needs to be machined to acceptable dimensional accuracy.

Electron beam freeform manufacturing is known in the art (e.g., see Taminger and Hafley ("*Characterization of 2219 Aluminum Produced by Electron Beam Freeform Fabrication*," Presented at the 13$^{th}$ Solid Freeform Fabrication Symposium, Aug. 5-7, 2002, Austin, Tex.; In proceedings, University of Texas at Austin (2002); Taminger and Hafley ("*Electron Beam Freeform Fabrication: A Rapid Metal Deposition Process*," Proceedings of the 3$^{rd}$ Annual Automotive Composites Conference, Sep. 9-10, 2003, Troy, Mich., Society of Plastics Engineers (2003); and Taminger and Hafley ("*Electron Beam Freeform Fabrication for Cost Effective Near-Net Shape Manufacturing*", NATO/RTOAVT-139 Specialists' Meeting on Cost Effective Manufacture via Net Shape Processing (Amsterdam, the Netherlands, 2006) (NATO). pp 9-25)). Taminger and Hafley (2006) describes a method and device for manufacturing structural metal parts directly from computer aided design data combined with electron beam freeform fabrication (EBF). The structural part is built by welding on successive layers of a metallic welding wire which is welded by the heat energy provided by the electron beam. The EBF process involves melting a metal wire into a molten pool made and sustained by a focused electron beam in a high vacuum environment. The positioning of the electron beam and welding wire is obtained by having the electron beam gun and the actuator supporting the substrate movably hinged along one or more axis (X, Y, Z, and rotation) and regulate the position of the electron beam gun and the support substrate by a four axis motion control system. The process is claimed to be nearly 100% efficient in material use and 95% effective in power consumption. The method can be employed both for bulk metal deposition and finer detailed depositions, and the method is claimed to obtain significant effect on lead time reduction and lower material and machining costs as compared to the conventional approach of machining the metal parts. The electron beam technology has a disadvantage of being dependent upon a high vacuum of $10^{-1}$ Pa or less in the deposition chamber.

It is known (e.g., see Adams, U.S. Pat. Pub. No. 2010/0193480) to use a TIG-welding torch to build objects by solid freeform fabrication (SFFF), where successive layers of metallic feedstock material with low ductility are deposited onto a substrate. A plasma arc is created by energizing a flowing gas using an electrode, the electrode having a variable magnitude electric current supplied thereto. The plasma stream is directed towards a predetermined targeted region to preheat the predetermined targeted region of the workpiece prior to deposition. The electric current is adjusted and the feedstock material is fed into the plasma stream to deposit molten feedstock in the predetermined targeted region. The current is adjusted and the molten feedstock is slowly cooled at an elevated temperature, typically above the brittle-to-ductile transition temperature of the feedstock material, in a cooling phase to minimize the occurrence of material stresses.

Withers et al. (U.S. Pat. Pub. No. 2006/185473) also describes using a TIG torch in place of the expensive laser traditionally used in a solid freeform fabrication (SFFF) process with relatively low cost titanium feed material by combining the titanium feed and alloying components in a way that considerably reduces the cost of the raw materials. Withers et al. also describes using titanium sponge material mixed with alloying elements formed into a wire where it can be used in an SFFF process in combination with a plasma welding torch or other high power energy beam to produce near net shaped titanium components.

Abbott et al. (WO 2006/133034, 2006) discloses a direct metal deposition process using a laser/arc hybrid process to manufacture complex three-dimensional shapes comprising the steps of providing a substrate and depositing a first molten metal layer on the substrate from a metal feedstock using laser radiation and an electric arc is disclosed. The electric arc can be provided by gas metal arc welding using the metal feedstock as an electrode. Abbott et al. teaches that the use of laser radiation in combination with gas metal arc welding stabilizes the arc and purportedly provides higher processing rates. Abbott et al. utilizes a metal wire guided by and exiting out of a wire guide. The metal of the metal wire is melted at the end and the molten metal is deposited by positioning the end over the deposition point. The required heat for melting the metal wire is supplied by an electric arc expanding between the tip of the electrode and the workpiece/deposition substrate, and by a laser irradiating the deposition area. Welding by melting a metal wire heated by an electric arc is known as gas metal arc welding (GMAW), of which in the case of using non-reactive gases to make the arc is also denoted as metal inert gas welding (MIG-welding).

A problem to be addressed is the speed of deposition of material on the base material to form the workpiece. One could increase the temperature of the metal wire to preheat the metal wire before it interacts with the arc of the arc torch. This could be achieved by increasing the flow rate of electric charge through the electrode (amperes of current) or modulating the cross-section of the metal wire to increase the resistive heating of the electrode. Titanium metal or titanium alloys heated above 400° C. may be subject to oxidation upon contact with oxygen. It is thus necessary to protect the weld and heated object which is being formed by layered freeform manufacture against oxygen in the ambient atmosphere.

Use of high current, however, can produce a number of problems. If the change in current is not controlled, a rapid overheating of the metal wire can occur, resulting in burn back of the metal wire to the contact tip. The burn back can result in the fusion of the metal wire with the contact tip, which would necessitate replacement of the contact tip. Use of high current also can cause the contact tip itself to heat up and can result in overheating of the contact tip. One of the results of overheating of the contact tip can be tip elongation. Depending on the configuration of the contact tip, such elongation could result in the contact tip being repositioned closer to the metal wire wire, which can increase the friction between the contact tip and the metal wire, would could damage or scratch the metal wire wire. Modulation in contact tip geometry caused by overheating also can result in uneven contact tip wear because of thermal induced elongation or unevenness. This can lead to the formation of electric arc formation within the contact tip. Overheating of the contact tip also can result in the formation of micropores in the contact tip, which can cause the welding apparatus to operate erratically.

These problems that can result from use of high currents at the contact tip can result in the need for frequent replacement of contact tips and, in worst case scenarios, cleaning of the welding apparatus. Replacement of the contact tip and/or cleaning of the apparatus requires shutting down the apparatus, halting production. This is expensive and negatively impacts productivity.

There also exists a need in this art for an economical method of performing direct metal deposition at an increased rate of metal deposition. There further exists a need in this art for an apparatus that allows increased throughput and yield of direct metal deposition formed products without the risk of frequent contact tip replacement due to overheating.

SUMMARY OF THE INVENTION

An objective of the present invention is to provide an apparatus that allows increased throughput and yield of direct metal deposition formed products without the risk of frequent contact tip replacement due to overheating. Another objective is to provide an apparatus for use in direct metal deposition formed product production that can utilize high flow rates of electric charge. The apparatus provided herein can handle high electric current. For example, the apparatus could handle electric currents of 100, 200, 300, 350, 400 amps or more. The apparatus provided herein also alleviates temperature expansion of the metal wire and the guide.

Another objective of the invention is to provide a method for rapid layered manufacture of objects in titanium or titanium alloys.

This invention addresses the needs for an improved, economical method of performing direct metal deposition. This invention further addresses the need for a method of increasing throughput and yield of direct metal deposition formed parts with smooth, well-defined deposition boundaries.

Another object and advantage of the present invention is the contact tip improvements reduce metal wire feeding problems and result in lower labor costs and increased productivity. It is noted that although the invention is described in correlation with the use of a metal wire, any conductive structure that can be guided and melted to deposit material can be used, for example any consumable electrode of appropriate size and shape can be used.

The apparatus provided herein increases the deposition rate by supplying the metal wire in the form of a wire, using a relatively high flow rate of electric charge in the metal wire, and cooling the contact tip with a fluid cooling system. The fluid cooling system incorporates cooling channels into the contact tip or guide or both. The cooling channels can be positioned close to where the current is flowing. In some embodiments, the cooling channels are located in sufficient proximity to the contact tip to allow rapid transfer of thermal energy to the cooling channels.

Provided herein is a fluid-cooled contact tip assembly. An exemplary embodiment is depicted in FIG. 1. The fluid-cooled contact tip assembly 100 can include a guide 120, and an electric contact unit 200 that contains a contact tip 215 connected to an electrical source by way of an electrical connection 230. In some embodiments, the contact tip assembly 100 can include a fluid-cooled electric contact unit 200, or a fluid-cooled guide 120, or both a fluid-cooled electric contact unit 200 and a fluid-cooled guide 120.

The contact tip assembly 100 also can include a wire pressing assembly 190 to press a metal wire into contact with the contact tip 215. The wire pressing assembly 190 can include an insulated tip 195 that can be brought into contact with the metal wire 180 via action of the wire pressing assembly 190, where the insulated tip 195 presses the metal wire into contact with the contact tip 215. The wire pressing assembly 190 can be made of or can contain Ti or a Ti alloy. The wire pressing assembly 190 can be connected to electric contact unit 200, such as by using a shaft that allows wire pressing assembly 190 to freely move about the shaft so that the wire pressing assembly 190 can press a metal wire against the contact tip 215. The connecting shaft can be or can be coated with a thermally insulating material so that the wire pressing assembly 190 can be thermally isolated from electric contact unit 200. In the systems, devices and methods provided herein, a consumable contact tip 215 is separate and apart from the guide, and the metal wire is brought into contact with the contact tip after the metal wire has passed through an end portion of the guide.

The wire pressing assembly 190 exerts a force to press the metal wire 180 into contact with the contact tip 215. The force of the wire pressing assembly 190 can be generated using a spring, hydraulics, pneumatic actuators, mechanized screws or a motorized piston assembly or any combination thereof. In some embodiments, a spring exerts the pressure that causes wire pressing assembly 190 to press the metal wire 180 into contact with the contact tip 215. The spring can be a compression spring, a tension spring or a torsion spring. The wire pressing assembly 190 can include a plurality of springs, each of which can be a compression spring, a tension spring or a torsion spring.

The fluid-cooled contact tip assembly can include a support element 350 to which the guide 120 and the electric contact unit 200 can be connected for support. When the contact tip assembly 100 includes a fluid-cooled guide 120, the support element 350 can be configured to include a coolant supply inlet 570 connectable to be in fluid communication with the guide coolant inlet 157, and a coolant supply outlet 580 connectable to be in fluid communication with the guide coolant outlet 159. The support element 350 can be thermally isolated from any of the components attached to the support element 350 by using a thermally insulating material 560 between the support element 350 and any attached components, such as the electric contact unit 200. The thermally insulating material 560 does not readily transmit thermal energy. Exemplary materials that can be used as thermally insulating material include ceramics and plastics.

The fluid-cooled contact tip assembly can include a connector 450 affixed to the support element 350 via fastener 465. The connector 450 can attach a metal wire delivery source 400 to the support element 350, and can include an opening 460 to accommodate the metal wire. The metal wire is delivered to one end of the guide 120, passes through the guide 120 and exits the other end of the guide 120, where it is positioned in the plasma arc above the deposition point of the workpiece. The contact tip 215 can be positioned so that it is brought into contact with the metal wire at a location within the guide 120. The contact tip 215 can be positioned so that it is brought into contact with the metal wire after the metal wire has exited the end of guide 120. The contact tip 215 is brought into contact with the metal wire at a defined contact point that does not move in the feeding direction, resulting in a constant length of metal wire being heated by resistive heating.

As shown in FIG. 2, the electric contact unit 200 can include a cooling system that includes a coolant inlet 225, an entry coolant channel 226 connected to and in fluid communication with the coolant inlet 225, an exit coolant channel 227 connected to and in fluid communication with the entry coolant channel 226, and a coolant outlet 228 connected to and in fluid communication with the exit coolant channel 227. The fluid-cooled contact tip assembly also includes a wire pressing assembly 190 positioned below the electric contact unit 200 and configured to press the metal wire 180 into contact with the contact tip 215 of the electric contact element 200.

An exemplary guide 120 of the fluid-cooled contact tip assembly is depicted in FIG. 3. The guide 120 has a longitudinal center axis A-A', a first end 140, and an opposite second end 150, and a center bore 130 extending and running along the longitudinal center axis of the guide 120 from its first end 140 to its second end 150 through which a metal wire 180 can be fed. The guide 120 can include an electrically insulating lining 160 that is inside of the center bore 130 and traverses the guide 120 at least from the first end 140 to the second end 150 of the guide 120. In the embodiment depicted, the electrically insulating lining 160 extends past the second end 150. The electrically insulating lining 160 includes a guide channel 170 having an inlet opening 145 at the first end 140 and an outlet opening 155 at the second end 150 and running through the linear electrically insulating lining 160 along the longitudinal center axis A-A', and the electrically insulating lining 160 guides a metal wire 180 being passed through the linear cylindrical guide channel 170 from the inlet opening 145 towards and further out of the outlet opening 155. The entry coolant channel 226 of the electric contact unit 200 can be configured to form a plurality of interconnected parallel channels in the vicinity of the contact tip 215. These channels can be parallel to the contact tip 215, such as depicted in FIG. 2, or can be perpendicular to the contact tip 215 or can have any orientation with respect to the plane of the contact tip 215. The interconnected channels form a continuous fluid pathway through the electric contact unit 200, the fluid pathway connecting the coolant inlet 225 to the coolant outlet 228. The electric contact unit 200 of the fluid-cooled contact tip assembly 100 can be configured to that it is positioned above the guide 120.

In some embodiments, the fluid-cooled contact tip assembly 100 includes a guide 120 that contains a cooling system. Exemplary embodiments are depicted in FIGS. 4A-4C. The cooling system can include a coolant inlet 157 connectable to be in fluid communication with an incoming coolant channel 135, an outgoing coolant channel 137 connected to and in fluid communication with the incoming coolant channel 135, and a coolant outlet 159 connected to and in fluid communication with the outgoing coolant channel 137. The coolant inlet 157 is connectable to be in fluid communication with a coolant supply inlet 570, and the coolant inlet 159 is connectable to be in fluid communication with a coolant supply outlet 580 (see FIG. 1).

In the fluid-cooled contact tip assembly provided herein, the guide 120 can include a bottom opening 125 in the bottom of the guide 120, as depicted in FIGS. 4A-4C. The bottom opening allows any dust or particles of the metal wire to exit the guide 120 prior to coming near the forming work piece. The guide can be made of or can include Ti or a Ti alloy, or Cu or a Cu alloy. The electric contact unit 200 and the contact tip 215 each independently can be made of or can contain Cu or a Cu alloy or composite, particularly a copper/tungsten alloy or composite.

The fluid-cooled contact tip assembly provided herein is configured so that after the metal wire 180 passes through the guide 120 the metal wire 180 is positioned in a plasma arc of a PAW torch or of a plasma transferred arc (PTA) torch above a deposition point of a workpiece.

Also provided are methods for manufacturing a three-dimensional work piece of a metallic material by solid freeform fabrication, where the object is made by fusing together successive deposits of the metallic material onto a base material, characterized in that the method uses a fluid-cooled contact tip assembly. In the methods, a base material of the same metallic material as the object is to be made is layered with successive deposits of metallic material, each successive deposit obtained by using a first PAW torch.

In preferred embodiments, the fluid-cooled contact tip assembly is used with system that utilizes two PAW torches. A second PAW torch can be used to preheat the base material so that it is receptive to molten drops of melted metal wire at the position at which the melted metallic material is to be deposited. In some embodiments, at least a portion of the base material is melted by the preheating PAW to make the base material more receptive. In some embodiments, sufficient heat is applied by the preheating PAW torch to form a molten pool in the base material at the position at which the metallic material is to be deposited.

A metal wire can be fed through the fluid-cooled contact tip assembly so that its distal end after exiting the contact tip assembly is positioned above the base material where the metallic material is to be deposited. In embodiments where the base material in preheated, the distal end of the metal wire after exiting the contact tip assembly can be positioned over a preheated area of the base material or even a molten pool in the base material, if one has been created. A PAW torch is then used to heat and melt the metal wire such that molten metallic material from the metal wire drips onto the base material and onto the preheated or molten or partially molten area of the base material if preheating was carried out. The base material and/or the one or more PAW torches can be moved in a predetermined pattern such that the successive deposits of molten metallic material from the melted metal wire is deposited onto the base material and solidifies and forms the three-dimensional work piece.

Also provided are methods for manufacturing a three-dimensional object of a metallic material by solid freeform fabrication, where the methods include depositing successive deposits of metallic material onto a base material. Each successive deposit is obtained by feeding a metal wire through a guide into a fluid cooled electric contact unit that conducts a current of at least 100 amps to a metal wire; and using a first PAW torch to heat and melt the wire such that a molten metallic material drips onto the base material. A deposition pattern is defined by moving at least one of the base material, and first PAW torch such that the successive deposits of molten metallic material from the melted wire solidifies and forms the three-dimensional object. The base material can be preheated where the metallic material is to be deposited. The preheating is carried out using a second PAW torch. The deposition pattern can also be defined by moving at least one of the base material, first PAW torch, and second PAW torch such that the successive deposits of molten metallic material from the melted wire solidifies and forms the three-dimensional object. In the methods provided, the fluid cooled electric contact unit includes a cooling system that can include a coolant inlet connectable to be in fluid communication with a coolant supply inlet; an incoming coolant channel connected to and in fluid communication with the coolant inlet; an outgoing coolant channel connected to and in fluid communication with the incoming coolant channel; and a coolant outlet connected to and in fluid communication with the outgoing coolant channel.

In the methods provided, the guide can include a cooling system that includes a coolant inlet connectable to be in fluid communication with a coolant supply inlet; an incoming coolant channel connected to and in fluid communication with the coolant inlet; an outgoing coolant channel connected to and in fluid communication with the incoming coolant channel; and a coolant outlet connected to and in fluid communication with the outgoing coolant channel. The metal wire can be or contain Al, Cr, Cu, Fe, Hf, Sn, Mn, Mo, Ni, Nb, Si, Ta, Ti, V, W, or Zr, or composites or alloys thereof. In some embodiments, the metal wire is a wire that contains Ti or a Ti alloy, or nickel or a nickel alloy.

Also provided are systems for manufacturing a three-dimensional object of a metallic material by solid freeform fabrication. The systems can include a fluid cooled guide for guiding a metal wire into a position above a base material; a fluid cooled electric contact unit in electrical contact with the metal wire to conduct a current of at least 100 amps to the metal wire; a first welding torch to melt the metal wire and cause a metallic material to drip over the base material; and a computer model of the object to be formed to define a deposition profile such that a physical object is built by fusing successive deposits of the metallic material onto the base material. The systems can also include an actuator tray that moves the base material relative to at least the welding torch. The systems can include an actuator arm that moves the first welding torch. The systems can further include a second welding torch for preheating the base material in an area where the metallic material is to be deposited. The system can also have an actuator arm that moves the second welding torch.

Additional features and advantages of the invention will be set forth in the description which follows, and in part will be apparent from the description, or can be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. For clarity, the figures are not to scale and some components are omitted.

In the drawings:

In FIG. 4A, an exemplary guide 120 containing a fluid pathway therein is shown. FIG. 4B is a top view of an embodiment in which the coolant fluid is circulated about the periphery of the guide 120. FIG. 4C is a sectional view of an exemplary guide 120, containing a wire guide incoming coolant channel 135 and a wire guide outgoing coolant channel 137.

DETAILED DESCRIPTION

A. Definitions

Figure 1:
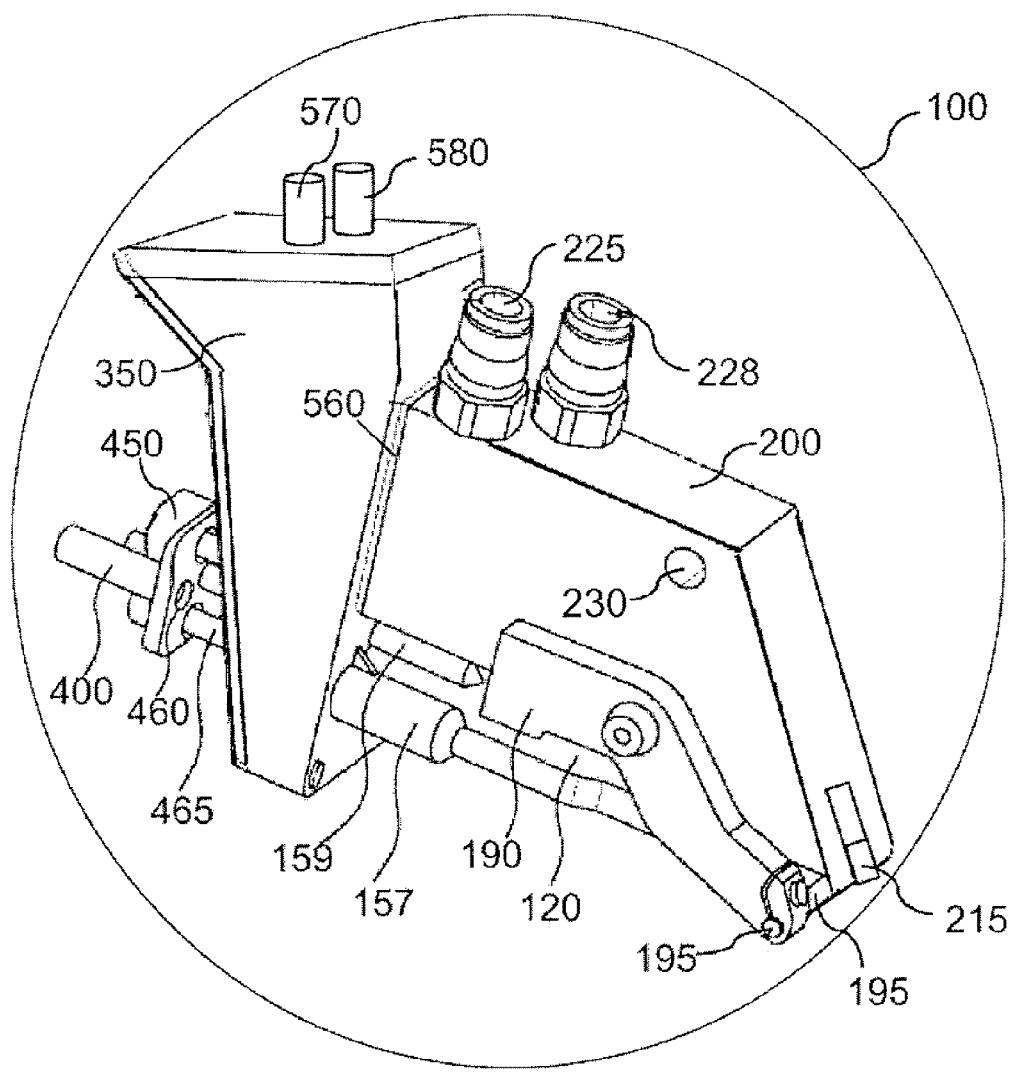
FIG. 1 is a skewed side view of an embodiment of the cooled contact tip assembly provided herein.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, the term "contact tip" refers to the element that electrically connects the metal wire in a MIG-welding operation.

As used herein, a "combination" refers to any association between two items or among more than two items. The association can be spatial or refer to the use of the two or more items for a common purpose.

The term "plasma transferred arc torch" or "PTA torch" as used interchangeably herein refers to any device able to heat and excite a stream of inert gas to plasma by an electric arc discharge and then transfer the flow of plasma gas including the electric arc out through an orifice (such as a nozzle) to form a constricted plume that extends out of the orifice and transfers the intense heat of the arc to a target region. The electrode and target region can be electrically connected to a direct current power source such that the electrode of the PTA torch becomes the cathode and the target region becomes the anode. This will ensure that the plasma plume including electric arc is delivering a highly concentrated heat flow to a small surface area of the target region with excellent control of the areal extension and magnitude of the heat flux being supplied from the PTA torch. A plasma transferred arc has the advantage of providing stable and consistent arcs with little wandering and good tolerance for length deviations between the cathode and anode. Thus, the PTA torch is suitable both for heating the base material, e.g., to melt at least a portion thereof or to form a molten pool in the base material, as well as to heat and melt the metallic wire feed. The PTA torch may advantageously have an electrode made of tungsten and a nozzle made of copper. However, the invention is not tied to any specific choice or type of PTA torch. Any known or conceivable device able to function as PTA torch providing a stable heat source for melting the metal electrode wire can be used.

As used herein, a "Plasma Arc Welding torch" or "PAW torch" refers to a welding torch that can be used in plasma arc welding. The torch is designed so that a gas can be heated to a high temperature to form plasma and becomes electrically conductive, the plasma then transfers an electric arc to a workpiece, and the intense heat of the arc can melt metal and/or fuse two pieces of metal together. A PAW torch can include a nozzle for constricting the arc thereby increasing the power density of the arc. The plasma gas typically is argon. Plasma gas can be fed along an electrode and ionized and accelerated in the vicinity of a cathode. The arc can be directed towards the workpiece and is more stable than a free burning arc (such as in a TIG torch). The PAW torch also typically has an outer nozzle for providing a shielding gas. The shielding gas can be argon, helium or combinations thereof, and the shielding gas assists minimizing oxidation of the molten metal. Current typically is up to 400 A, and voltage typically is in the range of about 25-35 V (but can be up to about 14 kW). PAW torches include plasma transferred arc torches.

The term "metallic material" as used herein refers to any known or conceivable metal or metal alloy which can be formed into a wire and employed in a solid freeform fabrication process to form a three-dimensional object. Examples of suitable materials include, but are not limited to, titanium and titanium alloys such as i.e. Ti-6Al-4V alloys, nickel and nickel alloys and others metals or metal alloys.

The term "base material" as used herein refers to the target material upon which metallic material is to be deposited. The base material will be the holding substrate when depositing the first layer of metallic material. When one or more layers of metallic material have been deposited onto the holding substrate, the base material will be the upper layer of deposited metallic material that is to have deposited a new layer of metallic material.

The term "holding substrate" as used herein refers to the target substrate that is first loaded into the chambers upon which additional material, the same or different from that of the holding substrate, is deposited using the technique of SFFF of solid free form fabrication to form a workpiece. In exemplary embodiments, the holding substrate is a flat sheet. In alternative embodiments, the holding substrate may be a forged part. In alternative embodiments, the holding substrate may be an object upon which additional material is to be deposited. In exemplary embodiments, the holding substrate can become part of the workpiece. The material for the holding substrate can be a metal or a metal alloy. In exemplary embodiments, the holding substrate is made of the same metal as the wire feed material.

As used herein, the term "workpiece" refers to a metal body being produced using solid free form fabrication.

The term "computer assisted design model" or "CAD-model" as used interchangeably herein refers to any known or conceivable virtual three-dimensional representation of the object that is to be formed which can be employed in the control system of the arrangement according to the second aspect of the invention: to regulate the position and movement of the holding substrate and to operate the welding torch with integrated wire feeder such that a physical object is built by fusing successive deposits of the metallic material onto the holding substrate or base material in a pattern which results in building a physical object according to the virtual three-dimensional model of the object. This may, for instance, be obtained by forming a virtual vectorized layered model of the three-dimensional object by first dividing the virtual three-dimensional model into a set of virtual parallel horizontal layers and then dividing each of the parallel layers into a set of virtual quasi one-dimensional pieces. Then, the physical object can be formed by engaging the control system to deposit and fuse a series of quasi one-dimensional pieces of the metallic material feed onto the supporting substrate in a pattern according to the first layer of the virtual vectorized layered model of the object. Then, repeating the sequence for the second layer of the object by depositing and fusing a series of quasi one-dimensional pieces of the weldable material onto the previous deposited layer in a pattern according to the second layer of the virtual vectorized layered model of the object. The deposition continues based on the repetition of the deposition and fusing process layer by layer for each successive layer of the virtual vectorized layered model of the object until the entire object is formed.

However, the invention is not tied to any specific CAD-model and/or computer software for running the control system of the arrangement according to the invention, and nor is the invention tied to any specific type of control system. Any known or conceivable control system (CAD-model, computer-aided manufacture (CAM) system or software, computer software, computer hardware and actuators etc.) able to build metallic three-dimensional objects by solid freeform fabrication may be employed. In exemplary embodiments, the control system can be adjusted to separately operate a first PAW torch to preheat the base material and a second PAW torch to melt the feed wire of metallic material into the molten pool. The first PAW torch can provide sufficient energy to preheat the base material so that it is receptive to molten drops of melted metal wire, i.e. melted metallic material, at the position at which the melted metallic material is to be deposited. Preheating the base material can ensure adequate melt-in to the base material by the metallic material provided by the metal droplet of the melted metal wire. The first PAW torch promotes fusion between the base material and the melted metallic material by deepening the melt-in in the base material. In some embodiments, the preheating does not melt the base material. In alternative embodiments, at least a portion of the base material is melted by the first PAW to make the base material more receptive. In some embodiments, sufficient heat is applied by the first PAW torch to form a molten pool in the base material at the position at which the metallic material is to be deposited.

Positioning of the base material and any one or more PAW torches can be accomplished using one or more actuators. In exemplary embodiments, the base material can be repositioned or moved using an actuator tray over which the base material is resting. The actuator tray can move the base material in any direction. In exemplary embodiments the actuator tray can be set on a track or rail system and able to move the base material in any desired direction. Alternatively, the actuator tray may be operated using a mechanical or robotic arm. The actuator may also be operated using hydraulics. Similarly, the one or more PAW torches may be moved using one or more actuators. For example, each of the one or more PAW torch may be attached to an independently controlled actuator arm, such as a robotic or mechanical arm. The actuators may also be operated using hydraulics. Use of other types of mechanisms for the actuator arm can also be implemented, such as for example rail or track systems. In exemplary embodiments in which two or more PAW torches are used, each PAW torch can be moved independently. In alternative embodiment using two or more PAW torches, the position of two or more PAW torches can be fixed relative to each other and one or more actuator arms move the two or more PAW torches simultaneously. In exemplary embodiments, the actuator tray is the only actuator used, keeping the one or more PAW torches at a fixed position during deposition. In alternative embodiments, the actuator tray moves the base material only within two direction in one plane, while one or more actuator arms move the one or more PAW torches in only one direction, for example perpendicularly to the plane in which the actuator tray moves. The opposite may also be true, where the one or more actuator arms move the one or more PAW torches in two directions within a plane while and the actuator tray moves the base material along a single direction. In alternative embodiments, the base material is maintained in a fixed position during deposition, and one or more actuator arms are used to move the one or more PAW torches. In yet an alternative embodiment, an actuator tray and one or more actuator arms are all used to move the base material and the one or more PAW torches.

B. Fluid-Cooled Contact Tip Assembly

Provided herein is a fluid-cooled contact tip assembly. The fluid-cooled contact tip assembly allows increased throughput and yield of direct metal deposition formed products without the risk of frequent contact tip replacement due to overheating. Because the fluid-cooled contact tip assembly removes thermal energy from the vicinity of the contact tip, a higher flow rate of electric charge can be used than in traditional contact tips, which can result in increased production rates of metal deposition formed product production due to the deposition of more metal from the metal wire onto the base material forming the work piece at a faster rate. The fluid-cooled contact tip can utilize a high electric current. For example, an electric current of 350, 375 or 400 amps or more can be used. The fluid-cooled contact tip assembly can include an electric contact unit containing channels therein, the channels being configured to allow a cooling fluid to flow through the electric contact unit to remove thermal energy therefrom. The fluid channels of the electric contact unit can be configured so that the channels are in the vicinity of the contact tip, and remove thermal energy from the vicinity of the contact tip. Such a configuration of the cooling channels can remove any excess thermal energy in the vicinity of the contact tip, and can prevent thermal expansion of the contact tip. In the systems, devices and methods provided herein, a consumable contact tip is separate and apart from the guide, and the metal wire is brought into contact with the contact tip after the metal wire has passed through an end portion of the guide.

The fluid-cooled contact tip assembly also can include a fluid-cooled guide. The guide has a center bore that runs along the longitudinal center axis of the guide through which a metal wire can traverse. The guide is positioned below electric contact unit, and the metal wire enters one end of the guide, passes through the guide, and exits the other end of the guide, where it is positioned in the plasma arc of the PTA torch above the deposition point of the workpiece. The guide can include a cooling fluid pathway. The cooling fluid pathway includes a guide coolant inlet that is connected to and in fluid communication with a coolant channel that traverses the guide and allows cooling fluid to flow through the guide to absorb thermal energy from the electric contact unit with which the guide is in thermal communication. The coolant channels can be engineered to be contained within the guide. For example, the cooling channel can be positioned so that they traverse the upper portion of the guide that is in contact with at least a portion of the electric contact unit. The coolant channels also can be disposed on an edge of the guide.

An exemplary embodiment of the fluid-cooled contact tip assembly 100 is shown in FIG. 1. In the embodiment shown, the contact assembly includes a guide 120, an electric contact unit 200, and wire pressing assembly 190. The electric contact unit 200 can be connected to a support element 350. The electric contact unit 200 can be thermally isolated from the support element 350 by using a thermally insulating material 560 in the contact area between the electric contact unit 200 and the support element 350. The thermally insulating material 560 can be selected so that it does not readily transfer thermal energy. Exemplary materials that can be used for thermally insulating material 560 includes ceramics and plastics. Exemplary ceramics include the oxides or nitrides of Al, B, Zr, Mg, Y, Ca, Si, Ce, In and Sn and combinations thereof (e.g., see U.S. Pat. No. 6,344,287 (Celik et al., 2002); U.S. Pat. No. 4,540,879 (Haerther et al., 1985); and U.S. Pat. No. 7,892,597 (Hooker et al., 2011)).

The electric contact unit 200 includes a contact tip 215, a coolant inlet 225 and a coolant outlet 228. The coolant inlet 225 and a coolant outlet 228 are in fluid communication via coolant channels (shown in FIG. 2) that are contained within the electric contact unit 200 and allow cooling fluid to flow from coolant inlet 225, through the electric contact unit 200, particularly in the vicinity of the contact tip 215, and after absorbing thermal energy, the cooling fluid exits the electric contact unit 200 via coolant outlet 228.

The size of the electric contact unit 200 allows for usage of higher current through the electric contact unit 200 and to the contact tip 215. The electric contact unit 200 can be made of copper, a cooper alloy, titanium, or a titanium alloy. The replaceable contact tip 215 can be made of copper or a copper alloy or composite. The copper alloy can contain any of copper ASTM Classes II through X. The copper alloy or composite can include copper in combination with Ag, Al, Be, Bo, Cr, In, Mg, Ni, Sn, Sr, W, Zn or Zr or combinations thereof. In particular, the contact tip 215 can include a combination of copper and tungsten, such as a sintered copper/tungsten composite. The electric contact unit 200 includes electrical connection 230 to provide power to the contact tip 215. The electrical connection 230 allows the contact tip 215 to be electrically connected to a DC power source such that when the contact tip 215 is brought into contact with the metal wire, the metal wire becomes the anode. The electrode of a PTA torch is connected to the DC power source so that the PTA torch becomes the cathode.

Figure 2:
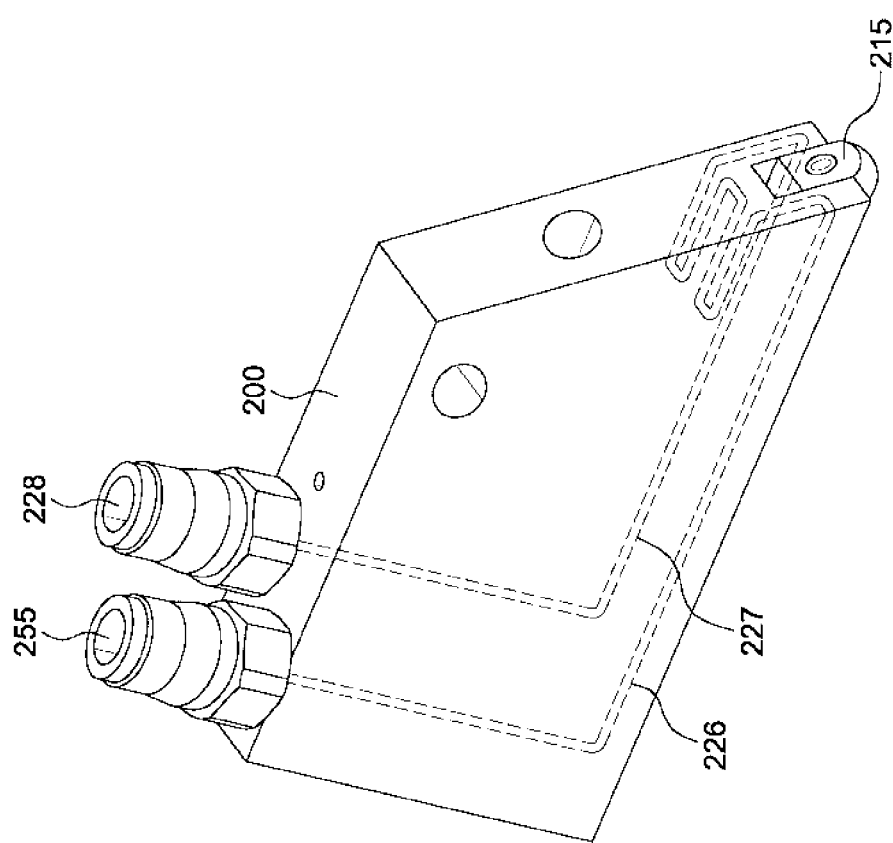
FIG. 2 is a schematic representation of an exemplary fluid cooled electric contact unit of the cooled contact tip assembly provided herein.

FIGS. 2 and 5 show exemplary embodiment of the electric contact unit 200. In FIGS. 2 and 5, a cooling fluid pathway is shown, the pathway including a coolant inlet 225, an entry coolant channel 226 that traverses the electric contact unit 200 and allows fluid flow from the coolant inlet 225 to the area in the vicinity of the contact tip 215, and an exit coolant channel 227 that allows warmed coolant to exit the electric contact unit 200 via coolant outlet 228. In operation, a fluid coolant flows through entry coolant channel 226, which acts as a heat exchanger. The fluid coolant absorbs thermal energy from the electric contact unit 200. In particular embodiments, the entry coolant channel 226 can extend up to the area in the vicinity of the contact tip 215, absorbing thermal energy from the contact tip 215. The cooling channels in the electric contact unit 200 can be configured to maximize extraction of heat from the contact tip 215. To facilitate the absorption or transfer of thermal energy, the entry coolant channel 226 can be lined with projections, such as pins or fins or other similar devices which, among other things, can increase surface contact between the cooling fluid and walls of the coolant channel 226.

Figure 3:
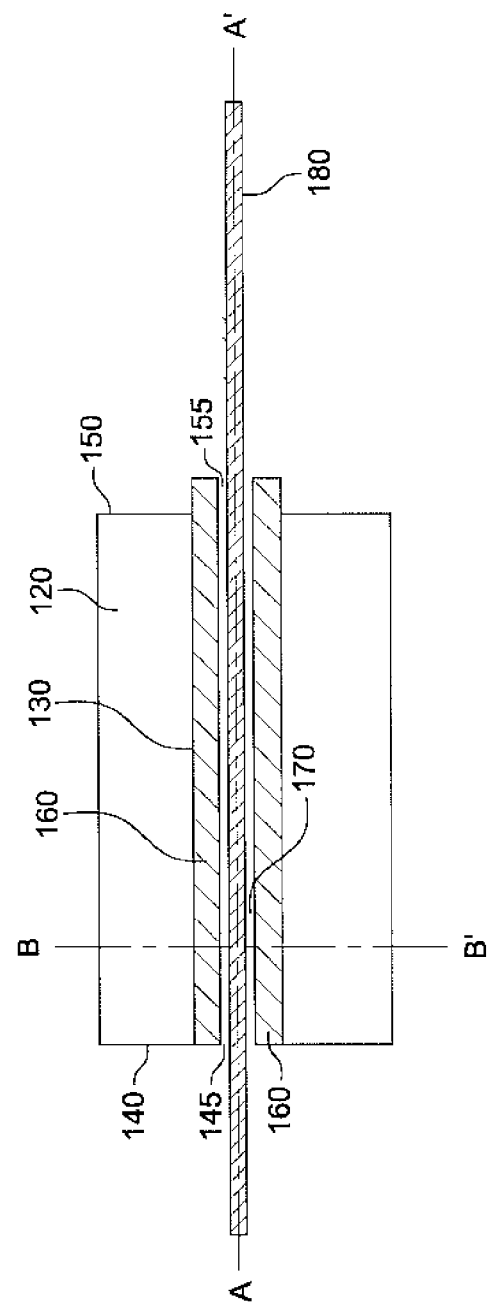
FIG. 3 is a schematic rendition of an exemplary configuration of a guide 120.

Although the entry coolant channel 226 is shown in FIGS. 2 and 3 as including a single layer of channels parallel to the contact tip 215, other configurations, such as arcs that traverse the area above the contact tip 215, or multiple channels that extend the length of the electric contact unit 200 or multiple layers of entry coolant channels 226, or entry coolant channels that are positioned along the periphery of the electric contact unit 200, or combinations thereof, can be used to cool the electric contact unit 200.

Any suitable cooling fluid appropriate for the temperatures expected to be encountered within the electric contact unit can be used. Exemplary cooling fluids include water, a $C_1$-$C_5$ alcohol, a polyalphaolefin, an alkylene glycol, such as ethylene glycol or propylene glycol, or mixtures thereof. In some embodiments, the cooling fluid is water, a mixture of water and propylene glycol, or a mixture of water and ethylene glycol. The cooling fluid can include additives, such as salts, corrosion inhibitors, pH adjusters or combinations thereof.

The contact tip assembly 100 also includes guide 120. An exemplary guide is shown in FIG. 3. The guide 120 can have a longitudinal center axis A-A', a first end 140, and an opposite second end 150, and a center bore 130 extending and running along the longitudinal center axis of the guide 120 from its first end 140 to its second end 150.

As depicted in FIG. 1, the guide 120 generally is positioned below electric contact unit 200, but the electric contact unit 200 can be configured so that the guide 120 can be positioned above the electric contact unit 200. The metal wire (not shown in FIG. 1) enters one end of the guide 120 passes through the guide 120 and exits the other end of the guide 120, where it is positioned in the plasma arc of PAW torch above the deposition point of the workpiece.

Figure 4A:
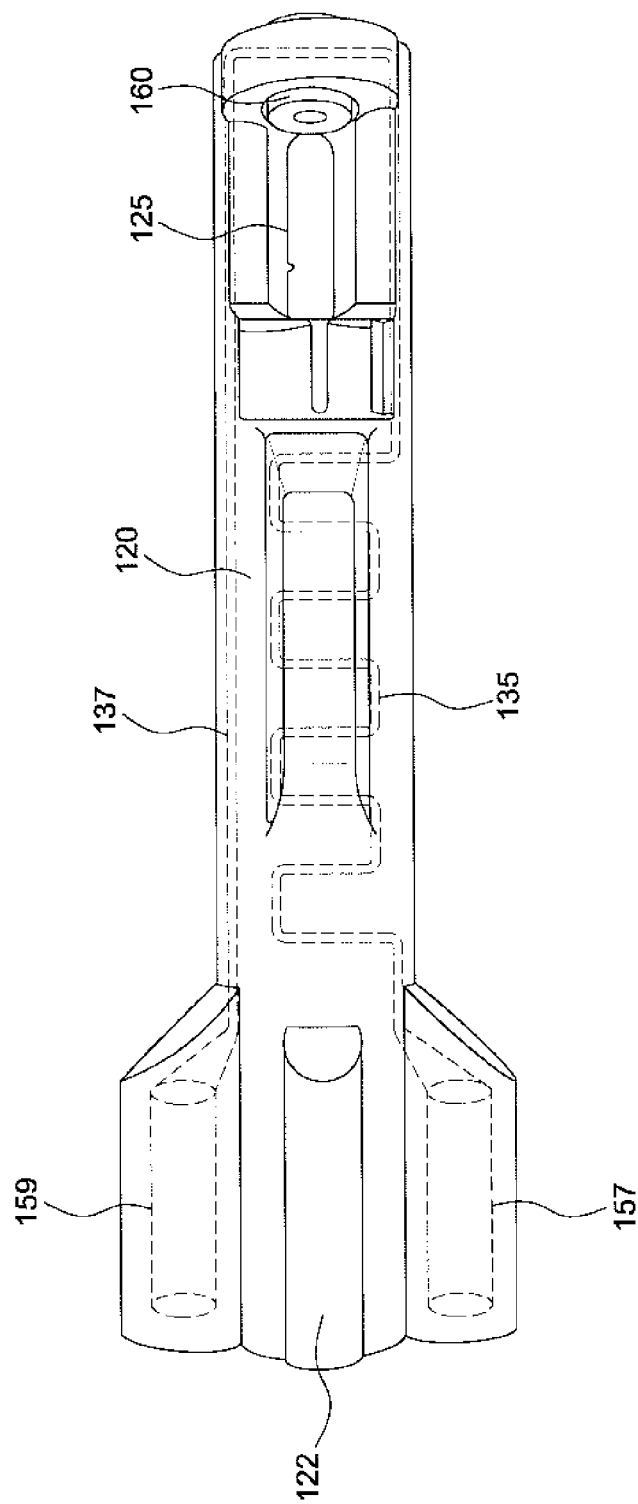
FIGS. 4A-4C show exemplary embodiments of a fluid-cooled guide.

The guide 120 can be of any shape, as long as it is configured to receive a metal wire and allow the metal wire to pass through the guide without hindrance. In some embodiments, the guide 120 can have a generally cylindrical shape to accommodate a metal wire that is in the form of a wire with a substantially circular cross section, as shown in FIG. 4A. The shape of the outer portion of the guide 120 can have a cross section that is circular, oval, elliptical, or polygonal, for example, square, triangular, rectangular, pentagonal, hexagonal, octagonal, or any combination thereof.

The guide can include projections or protrusions from the outer surface, such as to align the guide, or to allow attachment of the guide to a support or to other elements, or to engage with and/or guide the placement of the electric contact unit 200 in relation to the guide 120. For example, the embodiments shown in FIGS. 4A and 4B include fastener projection 122 that allows attachment of the guide 120 to a support.

The guide 120 can include a bottom opening 125 that allows any dust or particles of the metal wire to exit the guide 120 prior to coming near the forming work piece. The bottom opening 125 can extend to the end of the guide 120. The guide 120 can be truncated so that the metal wire 180 exits unsupported from outlet opening 155, as shown in FIG. 3. As shown in FIGS. 1 and 5, insulated tip 195 of the wire pressing assembly 190 presses the metal wire 180 into contact with the contact tip 215.

The guide 120 can include an electrically insulating lining 160 that can separate at least a portion of the guide 120 from the metal wire. The electrically insulating lining does not have to completely surround the metal wire 180. For example, a portion of the bottom of the electrically insulating lining 160 can be removed. For example, measured from the horizontal diameter of the electrically insulating lining, an arc segment subtending an angle of from about 10° to about 180° can be removed. When the electrically insulating lining has a circular cross section, removal of an arc segment subtending an angle of 180° results in a semi-circular electrically insulating lining covering the upper portion of the metal wire 180.

The guide can be electrically insulated from the metal wire using an electrically insulating lining containing an electrically insulating material suitable for use in the conditions to which the guide would be exposed during welding. The electrically insulating material can be or contain an electrically insulative ceramic. Such ceramics are known in the art and can include the oxides or nitrides of Al, B, Zr, Mg, Y, Ca, Si, Ce, In and Sn and combinations thereof. The electrically insulating material can be or contain aluminum nitride, aluminum oxide, magnesium nitride, magnesium oxide, quartz, silicon nitride, boron nitride, zirconium dioxide and mixtures and combinations thereof. The electrically insulating lining can be configured to be contained within the guide. The electrically insulating lining can be configured to extend from one or both ends of the guide.

When the electrically insulating lining includes an insulative ceramic in the vicinity of the central bore through which the metal wire passes, the insulative ceramic can include a surface treatment to reduce the roughness of the surface of the metal wire insulative ceramic. The surface treatment can help to minimize or eliminate scratching or scoring of the metal wire as it passes through the electrically insulating lining. For example, the surface of the electrically insulating lining can be treated to include a surface glaze that reduces the friction-causing attraction forces between the lining surface and the electrode. Laser glazing treatment can be used to reduce surface pores, cracks or deformations on the surface to reduce friction and produce a smoother insulative ceramic surface. The surface of the electrically insulating lining can be treated to include a diamond-like-carbon coating. PTFE can be applied to the surface of the electrically insulating lining to reduce friction. The surface treatment can help to minimize the formation of small pieces of metal wire that can form due to interaction of the metal wire with a rough insulative ceramic surface.

The guide 120 can be thermally isolated from the support element 350 by including a thermally insulating material 560 between the contact points between the guide 120 and the support element 350. Exemplary materials that can be used as a thermally insulating material 560 include ceramics and plastics.

The guide 120 can include a cooling fluid pathway. The cooling fluid pathway can minimize or eliminate temperature expansion of the metal wire within the guide 120, that could be caused by the high current of the contact tip 215. The cooling fluid pathway can minimize or eliminate temperature expansion of the guide 120. Thermal expansion of the guide 120 could result in increased friction between the guide and the metal wire, would could damage or scratch the electrode, which could displace the metal wire so that it is not properly positioned in the arc. Changes in the geometry of guide 120 caused by overheating also can result in uneven contact wear because of thermal induced elongation or unevenness. Overheating of the guide 120 also can result in the formation of deformations, micropores or fatigue in the guide 120, which can result in failure of the guide 120.

An exemplary embodiment is shown in FIG. 4A. In this embodiment, the cooling fluid pathway includes a guide coolant inlet 157 that is connected to and in fluid communication with incoming coolant channel 135, which traverses the guide 120 and allows cooling fluid to flow through the guide 120 to absorb thermal energy from the electric contact unit 200 with which the guide 120 is in thermal communication. In the embodiment shown, the incoming coolant channel 135 traverses the upper portion of the guide 120 that is in contact with at least a portion of the electric contact unit 200. After absorbing thermal energy, the cooling fluid flows through outgoing cooling channel 137 to guide coolant outlet 159 to exit the guide 120.

Figure 4B:
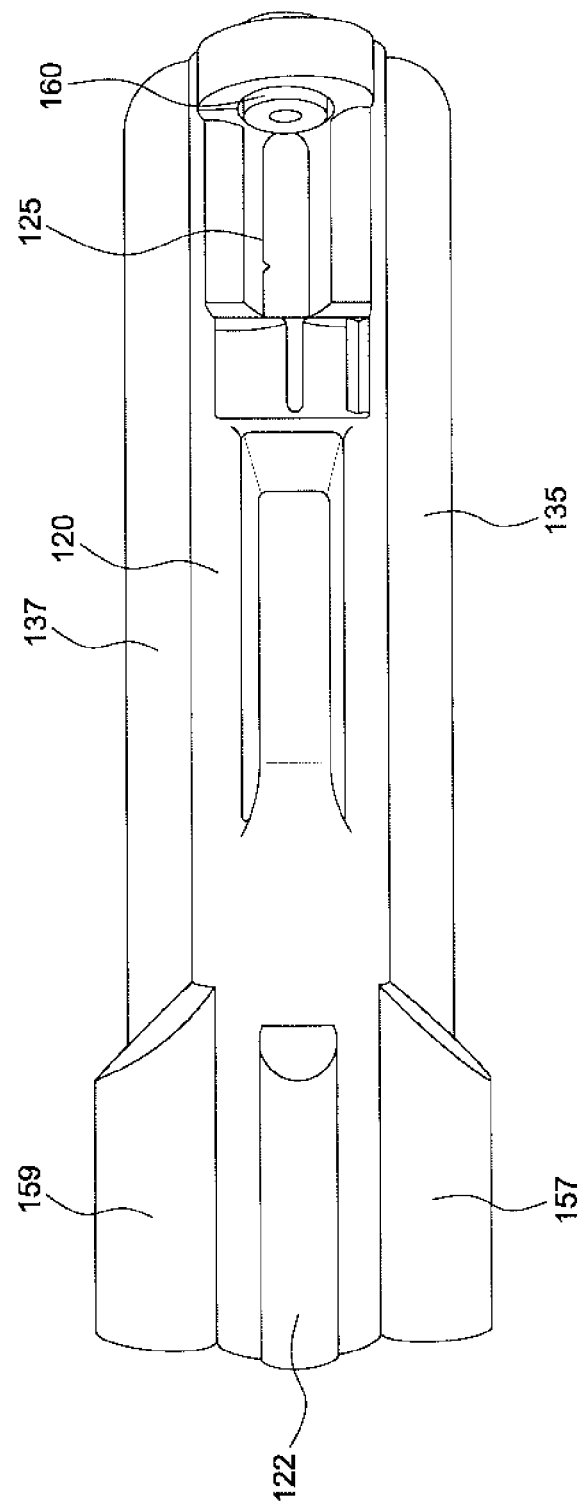
Figure 4C:
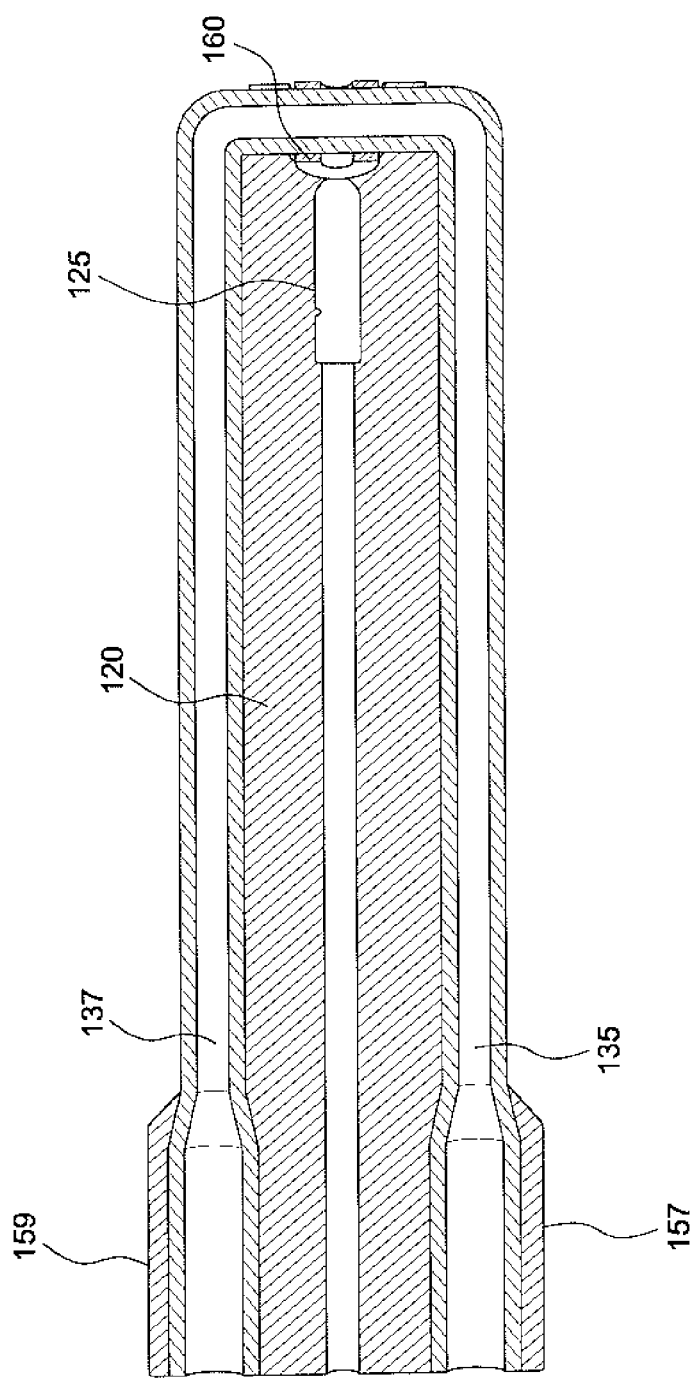

Another embodiment is depicted in FIGS. 4B and 4C. In the depicted embodiments, the guide coolant inlet 157 is connected to and in fluid communication with incoming coolant channel 135, which is disposed on an edge of the guide 120. After absorbing thermal energy, the cooling fluid flows through outgoing cooling channel 137 that is disposed on another edge of the guiding channel 120, and exits guiding channel 120 via guide coolant outlet 159.

Although the incoming coolant channel 135 is shown in FIG. 4A as including a single layer of channels parallel to the upper surface of the guide 120, other configurations, such as channels that are placed perpendicular to the upper surface of the guide 120, or multiple channels that extend the length of the guide 120, or multiple layers of incoming coolant channel 135, or combinations that include entry coolant channels that are positioned along the periphery of the guide 200, can be used to cool the guide 120.

In operation, a cooling fluid flows through coolant supply inlet 570 to guide coolant inlet 157, flows through incoming coolant channel 135 to absorb thermal energy, and the warmed cooling fluid flows through outgoing cooling channel 137 and exits guiding channel 120 via guide coolant outlet 159. Referring to FIG. 1, guide coolant inlet 157 is connected to the coolant supply inlet 570, and the guide coolant outlet 159 is connected to coolant supply 580. To facilitate the absorption or transfer of thermal energy, incoming coolant channel 135 can be lined with projections, such as pins or fins or other similar devices which, among other things, can increase surface contact between the cooling fluid and walls of the incoming coolant channel 135.

Any suitable cooling fluid appropriate for the temperatures expected to be encountered within the electric contact unit can be used. Exemplary cooling fluids include water, a $C_1$-$C_5$ alcohol, a polyalphaolefin, an alkylene glycol, such as ethylene glycol or propylene glycol, or mixtures thereof. In some embodiments, the cooling fluid is water, a mixture of water and propylene glycol, or a mixture of water and ethylene glycol. The cooling fluid can include additives, such as salts, corrosion inhibitors, pH adjusters or combinations thereof. The cooling fluid has a specific heat and the mass flow rate can be modulated to achieve an efficient cooling of the guide 120 and the electric contact unit 200.

A connector 450 can be affixed to the support element 350 via fastener 465. The connector 450 can attach a metal wire delivery source 400 to the support element 350, and can include an opening 460 to accommodate the metal wire. The metal wire is delivered to one end of the guide 120, passes through the guide 120 and exits the other end of the guide 120, where it is positioned in the plasma arc above the deposition point of the workpiece. The contact tip 215 can be positioned so that it is brought into contact with the metal wire at a location within the guide 120. The contact tip 215 can be positioned so that it is brought into contact with the metal wire after the metal wire has exited the end of guide 120.

The contact tip assembly provided herein includes a wire pressing assembly that presses the metal wire into contact with the contact tip. The wire pressing assembly can be any structure including a pin, clip, lever, or other structure and can have any shapes such as L-shape, straight, round, or angular shape, that can apply pressure to the metal wire to keep it contact with the contact tip. The wire pressing assembly can include an insulated tip that can contact the metal wire without transferring electricity to the rest of the pressing assembly. In alternative embodiments, the pressing assembly is fully coated with an insulated material. In exemplary embodiments, the pressing assembly is made of insulating material. With the configuration provided herein, it is possible to have a single point of contact between the metal wire and the contact tip of the electric contact unit. This can provide a defined contact point that does not move in the feeding direction. This allows a constant length of metal wire to be heated by resistive heating. An exemplary embodiment is shown in FIG. 1, and a view from a different perspective is shown in FIG. 3. Wire pressing assembly 190 includes an insulated tip 195 that presses the metal wire 180 into contact with contact tip 215. The insulated tip can be made of any material compatible with the environment and temperature to which the contact tip would be exposed. For example, the insulating materials that can be used for at least the tip of the pressing assembly, or for coating of the tip or larger portion of the pressing assembly can be or contain an electrically insulative ceramic. Exemplary ceramics include the oxides or nitrides of Al, B, Zr, Mg, Y, Ca, Si, Ce, In and Sn and combinations thereof. The electrically insulating material can be or contain aluminum nitride, aluminum oxide, magnesium nitride, magnesium oxide, quartz, silicon nitride, boron nitride, zirconium dioxide and mixtures and combinations thereof. In exemplary embodiments, the pressing assembly can be made of Ti or Ti alloy, with the tip of the pressing assembly either being coated or made of one of the above listed electrically insulating materials.

In some embodiments, the wire pressing assembly 190 can exert an pressure against the metal wire 180 as the metal wire 180 passes over the wire pressing assembly 190 to press the metal wire 180 into contact with the contact tip 215. In exemplary embodiments the pressure is an upward pressure. The pressure to keep the metal wire 180 in contact with the contact tip 215 can be achieved, for example, by using a spring. The spring can be selected to exert a force of appropriate strength or magnitude so that it is not so strong that the contact tip 180 or wire pressing assembly 190 scratches the wire, but strong enough to maintain contact between the contact tip 215 and the metal wire 180. A spring can be used to exert a pressure that results in the wire pressing assembly 190 pressing the metal wire into contact with contact tip 215. Any type of spring can be used, such as a compression, a tension, or a torsion spring, or any combination thereof. In some embodiments, a compression spring having a spring constant from about 0.001 to about 10 N/m can be used to force the wire pressing assembly 190 up toward the contact tip 215 so that the metal wire contacts the contact tip 215.

The diameter of the metal wire, according to certain embodiments of the present invention, can range from about 0.8 mm to about 5 mm. The metal wire can have any practically implementable dimension, e.g., 1.0 mm, 1.6 mm, 2.4 mm, etc. The feed rate and positioning of the metal wire can be controlled and modulated in accord with the effect of the power supply to the PAW torch in order to ensure that the metal wire is being continuously heated and is melted when it reaches the intended position above the preheated area in the base material.

The electric contact unit contains a contact tip that is brought into contact with the metal wire. The contact tip electrically connects the metal wire to a direct current power source. In exemplary embodiments, the contact tip may have a curved or semi-curved surface where it contacts the wire. The curved, or semi-curved surface can be sized appropriately to accommodate the wire to be contacted. For example, for a wire having a diameter of about 1.6 mm, the contact tip may have a curved or concave surface having a diameter of about 1.8 mm. Also, the surface area of the contact tip can be large enough to further help avoid overheating caused by the current transfer. In exemplary embodiments, the width or thickness of the contact tip can range from about 1 mm to about 10 mm. The contact tip can be or contain copper or a copper alloy. The copper alloy can contain any of copper ASTM Classes II through X. The copper alloy can include copper in combination with any one of Ag, Al, Be, Bo, Cr, In, Mg, Ni, Sn, Sr, W, Zn or Zr, or combinations thereof. For example, the contact tip can include a sintered composition of W and Cu, or an alloy of Cu and W.

The power source also can be connected to the target region of the metal body being formed by free form fabrication. In some embodiments, the electrical connection is made so that the metal wire is the cathode and the target region is the anode. In some embodiments, the electrical connection is made so that the metal wire is the anode and the target region is the cathode. When the metal wire enters the arc of the plasma transferred arc (PTA) torch, the plasma plume including electric arc delivers a highly concentrated heat flow to a small surface area of the target region with excellent control of the areal extension and magnitude of the heat flux being supplied from the PTA torch. A PTA torch has the advantage of providing stable and consistent arcs with little wandering and good tolerance for length deviations between the cathode and anode. The PTA torch can have an electrode made of tungsten and a nozzle made of copper or copper alloy. However, the invention is not tied to any specific choice or type of PTA torch. Any known or conceivable device able to function as a PTA torch can be used. Also, the invention may be implemented using a PAW torch that is not a PTA torch.

An electrically insulating material can be used to isolate the electric contact unit from the arc of the PAW torch. The electrically insulating material can be positioned at the outlet opening of the guide of the metal wire so that it extends some distance from the outlet opening. The length of the electrically insulating material extending from the outlet opening can be about 0.1 to 10 mm, or from about 0.5 to 5 mm, or about 1 mm. An exemplary embodiment is shown in FIG. 4A, which shows an electrically insulating material 160 extending past the end of the guide 120.

The fluid-cooled contact tip assembly can be used in methods for manufacturing a three-dimensional work piece of a metallic material by solid freeform fabrication, where the object is made by fusing together successive deposits of the metallic material onto a base material. In preferred embodiments, the fluid-cooled contact tip assembly is used with system that utilizes two PAW torches and more preferably two PTA torches, such as described in WO 2012/134299 (Stempfer, 2012). In the methods provided herein, a base material of the same metallic material as the object to be made is layered with successive deposits of metallic material, each successive deposit obtained by using a first PAW torch to preheat and the base material at the position at which the metallic material is to be deposited to make is more receptive to droplets of molten metal from a melted metal wire, feeding a metal wire through the fluid-cooled contact tip assembly so that its distal end after exiting the contact tip assembly is positioned above the preheated base material onto which molten metal is to be deposited, and using a second PAW torch to heat and melt the metal wire such that molten metallic material from the metal wire drips onto the preheated surface of the base material, and moving the base material relative to the position of the first and second PAW torches in a predetermined pattern such that the successive deposits of molten metallic material solidifies and forms the three-dimensional work piece. The first PAW torch can apply energy to the base material to ensure an adequate melt-in of the superheated metal droplet from the melted metal wire on the preheated surface of the base material. In some embodiments, sufficient energy is applied by the first PAW torch to melt at least a portion of the surface of the base material. In some embodiments, the first PAW torch forms a molten pool in the base material at the position at which molten metal droplets from the melted metal wire are to be applied.

The two torch system makes it possible to increase the heat supply to the metal wire independently of the heat supply to the base material. In these configurations, when using PTA torches a direct current power source can be connected such that the electrode of the first PTA torch (positioned above the base material to heat the base material, such as to increase receptivity of the base material to molten droplets of melted metal wire) becomes the negative polarity and the base material becomes the positive polarity to define an electric circuit where electric charge is transferred by an arc discharge between the electrode of the first PTA torch and the base material. The negative pole of a direct current power source can be connected to the electrode of the second PTA torch (positioned near the distal end of the metal wire exiting the fluid-cooled contact tip assembly) and the positive pole is connected to the metal wire to form an electric circuit where electric charge is transferred by an arc discharge between the electrode of the second PTA torch and the metal wire. The first and second PTA torches can have the same or separate power sources and can have the same or separate regulators for regulating the power supply to each of the torches independently.

C. Examples

The following example is included for illustrative purposes only and is not intended to limit the scope of the embodiments provided herein.

An example of an embodiment of the fluid-cooled contact tip assembly is showed schematically in FIG. 1. In the example embodiment, the contact assembly includes a guide 120 made of titanium, an electric contact unit 200 made of copper, and wire pressing assembly 190 made of titanium coated at least in part with an insulating ceramic. As shown, the electric contact unit 200 is configured and positioned so that the contact tip 215 is near a PTA torch. A separately controlled PTA torch, not shown in FIG. 1, is used to preheat the base material. The first PTA torch preheats the base material so that it is receptive to molten drops of melted metal wire at the position at which the melted metallic material is to be deposited. In some embodiments, at least a portion of the base material is melted by the first PTA to make the base material more receptive. In some embodiments, sufficient heat is applied by the first PTA torch to form a molten pool in the base material at the position at which the metallic material is to be deposited. The separate second PTA torch melts the metal wire. This arrangement makes it possible to increase the amount of thermal energy generated in the metal wire independently of the amount of thermal energy applied to the base material to preheat the base material.

The electric contact unit 200 is connected to a support element 350 made of titanium. The electric contact unit 200 is thermally isolated from the support element 350 by using a plastic or ceramic as an isolation material 560 in the contact area between the electric contact unit 200 and the support element 350. The isolation material 560 is a material that does not readily transmit thermal energy. Exemplary materials that can be used as an isolation material include ceramics and plastics. The electric contact unit 200 includes a copper alloy contact tip 215 positioned so that the contact tip 215 is brought into contact with the metal wire after the metal wire exits the end of guide 120.

The electric contact unit 200 includes a cooling system that includes a coolant inlet 225 and a coolant outlet 228. The coolant inlet 225 and a coolant outlet 228 are in fluid communication via coolant channels (shown in FIG. 2) that are contained within the electric contact unit 200 and allow cooling fluid to flow from coolant inlet 225, through the electric contact unit 200, particularly in the vicinity of the contact tip 215, and after absorbing thermal energy, the cooling fluid exits the electric contact unit 200 via coolant outlet 228. In this example, the cooling fluid was water.

The electric contact unit 200 includes electrical connection 230 to provide power to the contact tip 215. The electrical connection 230 connects the contact tip 215 to a DC power source such that when the contact tip 215 is brought into contact with the metal wire, the metal wire becomes the anode. The electrode of the PTA torch is connected to the DC power source so that the PTA torch becomes the cathode.

The contact tip assembly 100 of the example also includes a titanium guide 120. The guide 120 is positioned below electric contact unit 200. The metal wire enters one end of the guide 120 passes through the guide 120 and exits the other end of the guide 120, where it is positioned in the plasma arc of the PTA torch above the deposition point of the workpiece. In the example shown, the contact tip 215 is brought into contact with the metal wire after the metal wire has exited the guide 120. In the example, the guide 120 has a generally cylindrical shape and a circular cross-section to accommodate a metal wire that is in the form of a wire with a substantially circular cross section, as shown in FIG. 4A. The shape of the outer portion of the guide 120 has a circular cross-section. The guide 120 of the example includes fastener projection 122 that allows attachment of the guide 120 to the support 350, as illustrated in FIGS. 4A and 4B. The guide 120 of the example also includes a bottom opening 125 that allows any dust or particles of the metal wire to exit the guide 120 prior to coming near the forming work piece.

In this example, the guide 120 includes an aluminum oxide ceramic electrically insulating lining 160 at the exit end of guide 120 that separates the guide 120 from the metal wire and completely surrounds a portion of the metal wire as it exits the guide 120 (see FIG. 4B). The guide 120 is thermally isolated from the support element 350 by including a ceramic or plastic thermally insulating material between the contact points between the guide 120 and the support element 350.

In this example, the guide 120 includes a cooling fluid pathway in which the cooling fluid is water. The cooling fluid pathway includes a guide coolant inlet 157 that is connected to and in fluid communication with incoming coolant channel 135, which traverses the guide 120 and allows cooling fluid to flow through the guide 120 to absorb thermal energy from the electric contact unit 200 with which the guide 120 is in thermal communication. In this example, the incoming coolant channel 135 traverses the upper portion of the guide 120 that is in contact with at least a portion of the electric contact unit 200. After absorbing thermal energy, the cooling fluid flows through outgoing cooling channel 137 to guide coolant outlet 159 to exit the guide 120.

As mention above, the fluid-cooled contact tip assembly was used in a two torch welding system, such as described in international patent application publication WO 2012/134299 (Stempfer, 2012). The two torch system makes it possible to increase the heat supply to the metal wire independently of the heat supply to the base material such that it becomes possible to increase the heat flux into the metal wire and to increase the deposition rate of the molten metallic metal wire without simultaneously overheating the base material and without risk of spatter, or excessive melting of the base material, or forming an excessive molten pool in the base material. In this example, a direct current power source is connected such that the electrode of the first PTA torch (positioned above the base material to preheat the base material) becomes the negative polarity and the base material becomes the positive polarity to define an electric circuit where electric charge is transferred by an arc discharge between the electrode of the first PTA torch and the base material. The electrode of the second PTA torch (positioned near the distal end of the metal wire exiting the fluid-cooled contact tip assembly) was connected to the negative pole of a direct current power source and the metal wire to the positive pole to form an electric circuit where electric charge is transferred by an arc discharge between the electrode of the second PTA torch and the metal wire. In this example, the first and second PTA torches had separate power sources and separate regulators for regulating the power supply to each of the torches independently. Separate thermal detectors were used with each PTA torch for monitoring the temperature of the deposition area of the base material and the temperature of the metal wire. A magnetic arc deflection means also was used for regulating the width and positioning of the arc.

The metal wire used was a Grade 5 titanium alloy having a diameter of 2.4 mm. The feed rate (the wire speed) and positioning of the metal wire was controlled and regulated in accordance with the effect of the power supply to the second PTA torch in order to ensure that the metal wire was being continuously heated and melted when the distal end reached the intended position above the preheated area of the base material. In this example, the first PTA torch (above the base material) was provided a current of about 250 amperes (A) and the second PTA torch was provided a current of up to 300 A. A deposition rate of about 5 kg/h was achieved.

A control system (such as a computer-aided manufacturing system) can be simultaneously engaged to operate and regulate the engagement of one or more actuators (not shown) that constantly positions and moves the base material and one or more PAW or PTA torches such that the intended deposition spot as given by the CAD-model of the object that is to be formed. The control system can also be engaged to operate any actuator controlling a preheating PAW or PTA torch such that a preheated area of the base material, or a molten pool in the base material, is where the melted metallic material is to be deposited.

The control system used in exemplary embodiments of the invention described herein can provide partial or complete automation of the deposition apparatus. The control system can include a computer processor or central processing unit (CPU), CPU display, one or more power supplies, power supply connections, signal modules as inputs and/or outputs, integrated shielding of analog signals, storage devices, circuit boards, memory chips or other storage medium, a non-transitory computer-readable storage medium having a computer-readable program embodied therein, or any combination thereof. The computer-readable program can containing appropriate software for automating any one or combination of systems. Exemplary control modules include, but are not limited to, the SIMATIC-S7-1500 from Siemens AG (Munich, Germany), the IndraMotion MTX system available from Bosch Rexroth AG (Lohr am Main, Germany). And the SIGMATEK C-IPC compact industrial computer system available from SIGMATEK GmbH & Co. KG (Lamprechtshausen, Austria).

It will be apparent to those skilled in the art that various modifications and variation can be made in the present invention without departing from the scope of the invention. Thus, it is intended that the present invention cover the modifications and variations of this invention provided they come within the scope of the appended claims and their equivalents.

REFERENCE SIGNS LIST

The following is a listing of the reference numerals used in the description and the accompanying Drawings.
100 Contact Tip assembly
120 Guide
122 Fastener projection
125 Bottom opening
130 Center bore
135 Wire guide incoming coolant channel
137 Wire guide outgoing coolant channel
140 First end
145 Inlet opening
150 Second end
155 Outlet opening
157 Wire guide coolant inlet
159 Wire guide coolant outlet
160 Electrically insulating lining
170 Guide channel
180 Metal wire (wire)
190 Wire pressing assembly
195 Insulated tip
200 Electric contact unit
215 Contact tip
225 Coolant inlet
226 Entry coolant channel
227 Exit coolant channel
228 Coolant outlet
230 Electrical connection
350 Support element
400 Metal wire delivery source
450 Connector
460 Opening to accommodate the metal wire
465 Fastener
560 Thermally insulating material
570 Coolant supply inlet
580 Coolant supply outlet

What is claimed is:

1. A fluid-cooled contact tip assembly for feeding a metal wire, comprising:
an electric contact unit comprising a contact tip;
a guide below the electric contact unit; and
a wire pressing assembly configured to press the metal wire into contact with the contact tip of the contact unit;
wherein the electric contact unit comprises:
the contact tip connected to an electrical source, the contact tip being separate and apart from the guide; and
a cooling system that includes:
a coolant inlet;
an entry coolant channel connected to and in fluid communication with the coolant inlet;

an exit coolant channel connected to and in fluid communication with the entry coolant channel; and a coolant outlet connected to and in fluid communication with the exit coolant channel.

2. The fluid-cooled contact tip assembly of claim 1 in which the guide comprises:

a longitudinal center axis, a first end, an opposite second end, and a center bore extending and running along the longitudinal center axis of the guide from the first end to the opposite second end; and a cooling system that includes:

a coolant inlet connectable to be in fluid communication with a coolant supply inlet;

an incoming coolant channel connected to and in fluid communication with the coolant inlet;

an outgoing coolant channel connected to and in fluid communication with the incoming coolant channel; and a coolant outlet connected to and in fluid communication with the outgoing coolant channel.

3. The fluid-cooled contact tip assembly of claim 1, wherein the entry coolant channel comprises a plurality of interconnected parallel channels proximate the contact tip.

4. The fluid-cooled contact tip assembly of claim 1, wherein the guide further comprises a bottom opening.

5. The fluid-cooled contact tip assembly of claim 1, wherein the guide comprises Ti or a Ti alloy.

6. The fluid-cooled contact tip assembly of claim 1, wherein the electric contact unit comprises Cu or a Cu alloy.

7. The fluid-cooled contact tip assembly of claim 1, wherein the contact tip comprises Cu or a Cu alloy.

8. The fluid-cooled contact tip assembly of claim 1, wherein wire pressing assembly comprises a spring that exerts a pressure that causes the wire pressing assembly to press the metal wire into contact with the contact tip.

9. The fluid-cooled contact tip assembly of claim 8, wherein the wire pressing assembly comprises an insulated tip where the insulated tip contacts the metal wire when pressing the metal wire into contact with the contact tip.

10. The fluid-cooled contact tip assembly of claim 1, wherein wire pressing assembly comprises Ti or a Ti alloy and is connected to electric contact unit.

11. The fluid-cooled contact tip assembly of claim 1, further comprising:

a support element to which the guide and the electric contact unit are connected; and a metal wire delivery source.

12. The fluid-cooled contact tip assembly of claim 11, further comprising a thermally insulating material between the support element and the electric contact unit.

13. The fluid-cooled contact tip assembly of claim 11, wherein the support element further comprises:

a coolant supply inlet connectable to be in fluid communication with the guide coolant inlet; and a coolant supply outlet connectable to be in fluid communication with the guide coolant outlet.

14. The fluid-cooled contact tip assembly of claim 1, wherein the wire guide is arranged such that after the metal wire passes through the guide the metal wire contacts a plasma arc above a workpiece.

* * * * *